US012003422B1

(12) United States Patent
Baumann et al.

(10) Patent No.: US 12,003,422 B1
(45) Date of Patent: Jun. 4, 2024

(54) METHODS FOR SWITCHING NETWORK PACKETS BASED ON PACKET DATA AND DEVICES

(71) Applicant: F5 Networks, Inc., Seattle, WA (US)

(72) Inventors: William Ross Baumann, Seattle, WA (US); Alan B. Mimms, Spokane, WA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 16/588,074

(22) Filed: Sep. 30, 2019

Related U.S. Application Data

(60) Provisional application No. 62/738,590, filed on Sep. 28, 2018.

(51) Int. Cl.
*H04L 69/22* (2022.01)
*H04L 47/41* (2022.01)
*H04L 67/568* (2022.01)

(52) U.S. Cl.
CPC ............ *H04L 47/41* (2013.01); *H04L 67/568* (2022.05); *H04L 69/22* (2013.01)

(58) Field of Classification Search
CPC ...... H04L 69/22; H04L 9/0643; H04L 63/306
See application file for complete search history.

(56) References Cited

U.S. PATENT DOCUMENTS

| 289,142 A | 11/1883 | Righter |
| 782,417 A | 2/1905 | Robb |
| 4,993,030 A | 2/1991 | Krakauer et al. |
| 5,218,695 A | 6/1993 | Noveck et al. |
| 5,282,201 A | 1/1994 | Frank et al. |
| 5,303,368 A | 4/1994 | Kotaki |
| 5,473,362 A | 12/1995 | Fitzgerald et al. |
| 5,511,177 A | 4/1996 | Kagimasa et al. |
| 5,537,585 A | 7/1996 | Blickenstaff et al. |

(Continued)

FOREIGN PATENT DOCUMENTS

| AU | 2003300350 A1 | 7/2004 |
| CA | 2080530 A1 | 4/1994 |

(Continued)

OTHER PUBLICATIONS

"Market Research & Releases, CMPP PoC documentation", last accessed Mar. 29, 2010, (http://mainstreet/sites/PD/Teams/ProdMgmt/MarketResearch/Unive- rsal).

(Continued)

*Primary Examiner* — Mansour Oveissi
(74) *Attorney, Agent, or Firm* — Troutman Pepper Hamilton Sanders LLP (F5 PATENTS)

(57) ABSTRACT

Methods, non-transitory computer readable media, network traffic manager apparatuses, and systems that assist with network packet switching based on packet data includes receiving a plurality of network packets. Next, header data and payload data is separated for each of the plurality of received network packets. Next, digest data is created from the separated header data for each of the plurality of network packets. One or more network actions are identified for each of the plurality of network packets based on the corresponding created digest data. The identified one or more network actions are performed on the separated header data and the payload data.

20 Claims, 5 Drawing Sheets

(56) References Cited

U.S. PATENT DOCUMENTS

| | | |
|---|---|---|
| 5,548,724 A | 8/1996 | Akizawa et al. |
| 5,550,816 A | 8/1996 | Hardwick et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,606,665 A | 2/1997 | Yang et al. |
| 5,623,490 A | 4/1997 | Richter et al. |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,926,816 A | 7/1999 | Bauer et al. |
| 5,937,406 A | 8/1999 | Balabine et al. |
| 5,991,302 A | 11/1999 | Berl et al. |
| 5,995,491 A | 11/1999 | Richter et al. |
| 5,999,664 A | 12/1999 | Mahoney et al. |
| 6,012,083 A | 1/2000 | Savitzky et al. |
| 6,026,500 A | 2/2000 | Topff et al. |
| 6,029,168 A | 2/2000 | Frey |
| 6,029,175 A | 2/2000 | Chow et al. |
| 6,041,365 A | 3/2000 | Kleinerman |
| 6,044,367 A | 3/2000 | Wolff |
| 6,047,129 A | 4/2000 | Frye |
| 6,047,356 A | 4/2000 | Anderson et al. |
| 6,067,558 A | 5/2000 | Wendt et al. |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,104,706 A | 8/2000 | Richter et al. |
| 6,128,627 A | 10/2000 | Mattis et al. |
| 6,128,717 A | 10/2000 | Harrison et al. |
| 6,154,777 A | 11/2000 | Ebrahim |
| 6,157,950 A | 12/2000 | Krishnan |
| 6,161,145 A | 12/2000 | Bainbridge et al. |
| 6,161,185 A | 12/2000 | Guthrie et al. |
| 6,181,336 B1 | 1/2001 | Chiu et al. |
| 6,202,156 B1 | 3/2001 | Kalajan |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,259,405 B1 | 7/2001 | Stewart et al. |
| 6,260,070 B1 | 7/2001 | Shah |
| 6,282,610 B1 | 8/2001 | Bergsten |
| 6,289,345 B1 | 9/2001 | Yasue |
| 6,292,832 B1 | 9/2001 | Shah et al. |
| 6,304,913 B1 | 10/2001 | Rune |
| 6,308,162 B1 | 10/2001 | Ouimet et al. |
| 6,324,581 B1 | 11/2001 | Xu et al. |
| 6,329,985 B1 | 12/2001 | Tamer et al. |
| 6,330,226 B1 | 12/2001 | Chapman et al. |
| 6,330,574 B1 | 12/2001 | Murashita |
| 6,338,082 B1 | 1/2002 | Schneider |
| 6,339,785 B1 | 1/2002 | Feigenbaum |
| 6,349,343 B1 | 2/2002 | Foody et al. |
| 6,353,848 B1 | 3/2002 | Morris |
| 6,363,056 B1 | 3/2002 | Beigi et al. |
| 6,370,527 B1 | 4/2002 | Singhal |
| 6,370,543 B2 | 4/2002 | Hoffert et al. |
| 6,374,263 B1 | 4/2002 | Bunger et al. |
| 6,389,433 B1 | 5/2002 | Bolosky et al. |
| 6,389,462 B1 | 5/2002 | Cohen et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,513,061 B1 | 1/2003 | Ebata et al. |
| 6,928,518 B2 | 8/2005 | Talagala |
| 6,934,706 B1 | 8/2005 | Mancuso et al. |
| 6,938,039 B1 | 8/2005 | Alexander et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,970,475 B1 | 11/2005 | Fraser et al. |
| 6,970,924 B1 | 11/2005 | Chu et al. |
| 6,973,455 B1 | 12/2005 | Vahalia et al. |
| 6,973,490 B1 | 12/2005 | Robertson et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,074 B2 | 1/2006 | Wan et al. |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 6,999,912 B2 | 2/2006 | Loisey et al. |
| 7,003,533 B2 | 2/2006 | Noguchi et al. |
| 7,003,564 B2 | 2/2006 | Greuel et al. |
| 7,006,981 B2 | 2/2006 | Rose et al. |
| 7,010,553 B2 | 3/2006 | Chen et al. |
| 7,013,379 B1 | 3/2006 | Testardi |
| 7,020,644 B2 | 3/2006 | Jameson |
| 7,020,669 B2 | 3/2006 | Mccann et al. |
| 7,023,974 B1 | 4/2006 | Brannam et al. |
| 7,024,427 B2 | 4/2006 | Bobbitt et al. |
| 7,035,212 B1 | 4/2006 | Mittal et al. |
| 7,039,061 B2 | 5/2006 | Connor et al. |
| 7,051,112 B2 | 5/2006 | Dawson |
| 7,054,998 B2 | 5/2006 | Arnott et al. |
| 7,055,010 B2 | 5/2006 | Lin et al. |
| 7,065,482 B2 | 6/2006 | Shorey et al. |
| 7,072,917 B2 | 7/2006 | Wong et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,286 B1 | 8/2006 | Malik |
| 7,089,491 B2 | 8/2006 | Feinberg et al. |
| 7,111,115 B2 | 9/2006 | Peters et al. |
| 7,113,962 B1 | 9/2006 | Kee et al. |
| 7,113,996 B2 | 9/2006 | Kronenberg |
| 7,120,728 B2 | 10/2006 | Krakirian et al. |
| 7,120,746 B2 | 10/2006 | Campbell et al. |
| 7,127,556 B2 | 10/2006 | Blumenau et al. |
| 7,133,863 B2 | 11/2006 | Teng et al. |
| 7,133,967 B2 | 11/2006 | Fujie et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,181,523 B2 | 2/2007 | Sim |
| 7,191,163 B2 | 3/2007 | Herrera et al. |
| 7,194,579 B2 | 3/2007 | Robinson et al. |
| 7,228,359 B1 | 6/2007 | Monteiro |
| 7,234,074 B2 | 6/2007 | Cohn et al. |
| 7,236,491 B2 | 6/2007 | Tsao et al. |
| 7,240,100 B1 | 7/2007 | Wein et al. |
| 7,243,089 B2 | 7/2007 | Becker-Szendy et al. |

(56) References Cited

U.S. PATENT DOCUMENTS

| | | |
|---|---|---|
| 7,243,094 B2 | 7/2007 | Tabellion et al. |
| 7,263,610 B2 | 8/2007 | Parker et al. |
| 7,269,168 B2 | 9/2007 | Roy et al. |
| 7,269,582 B2 | 9/2007 | Winter et al. |
| 7,272,613 B2 | 9/2007 | Sim et al. |
| 7,280,536 B2 | 10/2007 | Testardi |
| 7,284,150 B2 | 10/2007 | Ma et al. |
| 7,292,541 B1 | 11/2007 | C S |
| 7,293,097 B2 | 11/2007 | Borr |
| 7,293,099 B1 | 11/2007 | Kalajan |
| 7,293,133 B1 | 11/2007 | Colgrove et al. |
| 7,296,263 B1 | 11/2007 | Jacob |
| 7,299,250 B2 | 11/2007 | Douceur et al. |
| 7,308,475 B1 | 12/2007 | Pruitt et al. |
| 7,324,533 B1 | 1/2008 | Deliberato et al. |
| 7,330,486 B2 | 2/2008 | Ko et al. |
| 7,340,571 B2 | 3/2008 | Saze |
| 7,343,398 B1 | 3/2008 | Lownsbrough |
| 7,346,664 B2 | 3/2008 | Wong et al. |
| 7,373,438 B1 | 5/2008 | Debergalis et al. |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,409,440 B1 | 8/2008 | Jacob |
| 7,415,488 B1 | 8/2008 | Muth et al. |
| 7,415,608 B2 | 8/2008 | Bolosky et al. |
| 7,418,439 B2 | 8/2008 | Wong |
| 7,437,358 B2 | 10/2008 | Arrouye et al. |
| 7,440,982 B2 | 10/2008 | Lu et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Atsumi et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,532,577 B2 | 5/2009 | Park et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,577,723 B2 | 8/2009 | Matsuda et al. |
| 7,587,471 B2 | 9/2009 | Ebata et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,624,109 B2 | 11/2009 | Testardi |
| 7,639,883 B2 | 12/2009 | Gill |
| 7,640,347 B1 | 12/2009 | Sloat et al. |
| 7,644,109 B2 | 1/2010 | Manley et al. |
| 7,653,699 B1 | 1/2010 | Colgrove et al. |
| 7,656,788 B2 | 2/2010 | Ma et al. |
| 7,684,423 B2 | 3/2010 | Tripathi et al. |
| 7,685,177 B1 | 3/2010 | Hagerstrom et al. |
| 7,689,596 B2 | 3/2010 | Tsunoda |
| 7,694,082 B2 | 4/2010 | Golding et al. |
| 7,698,458 B1 | 4/2010 | Liu et al. |
| 7,711,771 B2 | 5/2010 | Kirnos |
| 7,734,603 B1 | 6/2010 | Mcmanis |
| 7,739,540 B2 | 6/2010 | Akutsu et al. |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,788,335 B2 | 8/2010 | Miloushev et al. |
| 7,809,691 B1 | 10/2010 | Karmarkar et al. |
| 7,822,839 B1 | 10/2010 | Pruitt et al. |
| 7,822,939 B1 | 10/2010 | Veprinsky et al. |
| 7,831,639 B1 | 11/2010 | Panchbudhe et al. |
| 7,849,112 B2 | 12/2010 | Mane et al. |
| 7,853,958 B2 | 12/2010 | Mathew et al. |
| 7,861,085 B1 | 12/2010 | Case et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,886,218 B2 | 2/2011 | Watson |
| 7,895,653 B2 | 2/2011 | Calo et al. |
| 7,900,002 B2 | 3/2011 | Lyon |
| 7,903,554 B1 | 3/2011 | Manur et al. |
| 7,904,466 B1 | 3/2011 | Valencia et al. |
| 7,908,245 B2 | 3/2011 | Nakano et al. |
| 7,913,053 B1 | 3/2011 | Newland |
| 7,953,085 B2 | 5/2011 | Chang et al. |
| 7,953,701 B2 | 5/2011 | Okitsu et al. |
| 7,958,222 B1 | 6/2011 | Pruitt et al. |
| 7,958,347 B1 | 6/2011 | Ferguson |
| 7,984,500 B1 | 7/2011 | Khanna et al. |
| 8,005,953 B2 | 8/2011 | Miloushev et al. |
| 8,015,157 B2 | 9/2011 | Kamei et al. |
| 8,024,443 B1 | 9/2011 | Jacob |
| 8,046,547 B1 | 10/2011 | Chatterjee et al. |
| 8,055,724 B2 | 11/2011 | Amegadzie et al. |
| 8,064,342 B2 | 11/2011 | Badger |
| 8,069,225 B2 | 11/2011 | Mccanne et al. |
| 8,099,758 B2 | 1/2012 | Schmeidler et al. |
| 8,103,622 B1 | 1/2012 | Karinta |
| 8,112,392 B1 | 2/2012 | Bunnell et al. |
| 8,117,244 B2 | 2/2012 | Marinov et al. |
| 8,155,128 B2 | 4/2012 | Balyan et al. |
| 8,171,124 B2 | 5/2012 | Kondamuru |
| 8,190,769 B1 | 5/2012 | Shukla et al. |
| 8,209,403 B2 | 6/2012 | Szabo et al. |
| 8,271,751 B2 | 9/2012 | Hinrichs, Jr. |
| 8,302,100 B2 | 10/2012 | Deng et al. |
| 8,326,798 B1 | 12/2012 | Driscoll et al. |
| 8,351,600 B2 | 1/2013 | Resch |
| 8,396,836 B1 | 3/2013 | Ferguson et al. |
| 8,463,850 B1 | 6/2013 | Mccann |
| 8,484,348 B2 | 7/2013 | Subramanian et al. |
| 8,559,313 B1 | 10/2013 | Mukerji et al. |
| 8,560,693 B1 | 10/2013 | Wang et al. |
| 8,601,000 B1 | 12/2013 | Stefani et al. |
| 9,172,756 B2 * | 10/2015 | Ramachandran ... H04L 67/1006 |
| 10,376,176 B2 | 8/2019 | Wabel et al. |
| 10,476,809 B1 | 11/2019 | Daniel et al. |
| 10,476,992 B1 | 11/2019 | Amdahl |
| 10,659,475 B2 | 5/2020 | Lazri et al. |
| 10,795,707 B2 | 10/2020 | Hay et al. |
| 10,880,265 B1 | 12/2020 | Li |
| 2001/0003164 A1 | 6/2001 | Murakami |
| 2001/0007560 A1 | 7/2001 | Masuda et al. |
| 2001/0047293 A1 | 11/2001 | Waller et al. |
| 2002/0012352 A1 | 1/2002 | Hansson et al. |
| 2002/0012382 A1 | 1/2002 | Schilling |
| 2002/0035537 A1 | 3/2002 | Waller et al. |
| 2002/0038360 A1 | 3/2002 | Andrews et al. |
| 2002/0059263 A1 | 5/2002 | Shima et al. |
| 2002/0065848 A1 | 5/2002 | Walker et al. |
| 2002/0072048 A1 | 6/2002 | Slattery et al. |
| 2002/0087571 A1 | 7/2002 | Stapel et al. |
| 2002/0087744 A1 | 7/2002 | Kitchin |
| 2002/0087887 A1 | 7/2002 | Busam et al. |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0106263 A1 | 8/2002 | Winker |
| 2002/0120727 A1 | 8/2002 | Curley et al. |
| 2002/0120763 A1 | 8/2002 | Miloushev et al. |
| 2002/0143819 A1 | 10/2002 | Han et al. |
| 2002/0143852 A1 | 10/2002 | Guo et al. |
| 2002/0143892 A1 * | 10/2002 | Mogul ............... H04L 67/5682 709/217 |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0162118 A1 | 10/2002 | Levy et al. |
| 2002/0174216 A1 | 11/2002 | Shorey et al. |
| 2002/0194112 A1 | 12/2002 | Depinto et al. |
| 2002/0194342 A1 | 12/2002 | Lu et al. |
| 2002/0198956 A1 | 12/2002 | Dunshea et al. |
| 2003/0005172 A1 | 1/2003 | Chessell |
| 2003/0009528 A1 | 1/2003 | Sharif et al. |
| 2003/0012382 A1 | 1/2003 | Ferchichi et al. |
| 2003/0018450 A1 | 1/2003 | Carley |
| 2003/0018585 A1 | 1/2003 | Butler et al. |

(56) References Cited

U.S. PATENT DOCUMENTS

| | | |
|---|---|---|
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0034905 A1 | 2/2003 | Anton et al. |
| 2003/0051045 A1 | 3/2003 | Connor |
| 2003/0055723 A1 | 3/2003 | English |
| 2003/0065956 A1 | 4/2003 | Belapurkar et al. |
| 2003/0074301 A1 | 4/2003 | Solomon |
| 2003/0105846 A1 | 6/2003 | Zhao et al. |
| 2003/0108000 A1 | 6/2003 | Chaney et al. |
| 2003/0108002 A1 | 6/2003 | Chaney et al. |
| 2003/0128708 A1 | 7/2003 | Inoue et al. |
| 2003/0130945 A1 | 7/2003 | Force et al. |
| 2003/0139934 A1 | 7/2003 | Mandera |
| 2003/0156586 A1 | 8/2003 | Lee et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0195962 A1 | 10/2003 | Kikuchi et al. |
| 2003/0200207 A1 | 10/2003 | Dickinson |
| 2003/0204635 A1 | 10/2003 | Ko et al. |
| 2003/0212954 A1 | 11/2003 | Patrudu |
| 2003/0220835 A1 | 11/2003 | Barnes, Jr. |
| 2003/0229665 A1 | 12/2003 | Ryman |
| 2003/0236995 A1 | 12/2003 | Fretwell, Jr. |
| 2004/0003266 A1 | 1/2004 | Gordon et al. |
| 2004/0006575 A1 | 1/2004 | Visharam et al. |
| 2004/0006591 A1 | 1/2004 | Matsui et al. |
| 2004/0010654 A1 | 1/2004 | Kawamoto et al. |
| 2004/0015783 A1 | 1/2004 | Lennon et al. |
| 2004/0017825 A1 | 1/2004 | Stanwood et al. |
| 2004/0028043 A1 | 2/2004 | Maveli et al. |
| 2004/0030627 A1 | 2/2004 | Sedukhin |
| 2004/0030740 A1 | 2/2004 | Stelting |
| 2004/0030857 A1 | 2/2004 | Krakirian et al. |
| 2004/0043758 A1 | 3/2004 | Sorvari et al. |
| 2004/0044705 A1 | 3/2004 | Stager et al. |
| 2004/0054748 A1 | 3/2004 | Ackaouy et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0093361 A1 | 5/2004 | Therrien et al. |
| 2004/0098595 A1 | 5/2004 | Aupperle et al. |
| 2004/0122926 A1 | 6/2004 | Moore et al. |
| 2004/0123277 A1 | 6/2004 | Schrader et al. |
| 2004/0133577 A1 | 7/2004 | Nickolov et al. |
| 2004/0133605 A1 | 7/2004 | Chang et al. |
| 2004/0133606 A1 | 7/2004 | Miloushev et al. |
| 2004/0138858 A1 | 7/2004 | Carley |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0167967 A1 | 8/2004 | Bastian et al. |
| 2004/0199547 A1 | 10/2004 | Winter et al. |
| 2004/0213156 A1 | 10/2004 | Smallwood et al. |
| 2004/0215665 A1 | 10/2004 | Edgar et al. |
| 2004/0236798 A1 | 11/2004 | Srinivasan et al. |
| 2004/0236826 A1 | 11/2004 | Harville et al. |
| 2005/0008017 A1 | 1/2005 | Datta et al. |
| 2005/0021703 A1 | 1/2005 | Cherry et al. |
| 2005/0027841 A1 | 2/2005 | Rolfe |
| 2005/0027862 A1 | 2/2005 | Nguyen et al. |
| 2005/0044158 A1 | 2/2005 | Malik |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0180419 A1 | 8/2005 | Park et al. |
| 2005/0187866 A1 | 8/2005 | Lee |
| 2005/0198234 A1 | 9/2005 | Leib et al. |
| 2005/0198501 A1 | 9/2005 | Andreev et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0256806 A1 | 11/2005 | Tien et al. |
| 2005/0273456 A1 | 12/2005 | Revanuru et al. |
| 2005/0289111 A1 | 12/2005 | Tribble et al. |
| 2006/0010502 A1 | 1/2006 | Mimatsu et al. |
| 2006/0031374 A1 | 2/2006 | Lu et al. |
| 2006/0031778 A1 | 2/2006 | Goodwin et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0074922 A1 | 4/2006 | Nishimura |
| 2006/0075475 A1 | 4/2006 | Boulos et al. |
| 2006/0080353 A1 | 4/2006 | Miloushev et al. |
| 2006/0100752 A1 | 5/2006 | Kim et al. |
| 2006/0106882 A1 | 5/2006 | Douceur et al. |
| 2006/0112367 A1 | 5/2006 | Harris |
| 2006/0123062 A1 | 6/2006 | Bobbitt et al. |
| 2006/0123210 A1 | 6/2006 | Pritchett et al. |
| 2006/0130133 A1 | 6/2006 | Andreev et al. |
| 2006/0140193 A1 | 6/2006 | Kakani et al. |
| 2006/0153201 A1 | 7/2006 | Hepper et al. |
| 2006/0167838 A1 | 7/2006 | Lacapra |
| 2006/0184589 A1 | 8/2006 | Lees et al. |
| 2006/0198300 A1 | 9/2006 | Li et al. |
| 2006/0200470 A1 | 9/2006 | Lacapra et al. |
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0235998 A1 | 10/2006 | Stecher et al. |
| 2006/0259320 A1 | 11/2006 | Lasalle et al. |
| 2006/0268692 A1 | 11/2006 | Wright et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282442 A1 | 12/2006 | Lennon et al. |
| 2006/0282461 A1 | 12/2006 | Marinescu |
| 2006/0282471 A1 | 12/2006 | Mark et al. |
| 2007/0005807 A1 | 1/2007 | Wong |
| 2007/0016613 A1 | 1/2007 | Foresti et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0038994 A1 | 2/2007 | Davis et al. |
| 2007/0061441 A1 | 3/2007 | Landis et al. |
| 2007/0088702 A1 | 4/2007 | Fridella et al. |
| 2007/0112775 A1 | 5/2007 | Ackerman |
| 2007/0124415 A1 | 5/2007 | Ev-Ran et al. |
| 2007/0124502 A1 | 5/2007 | Li |
| 2007/0130255 A1 | 6/2007 | Wolovitz et al. |
| 2007/0136308 A1 | 6/2007 | Tsirigotis et al. |
| 2007/0139227 A1 | 6/2007 | Speirs et al. |
| 2007/0147258 A1 | 6/2007 | Mottishaw |
| 2007/0162891 A1 | 7/2007 | Burner et al. |
| 2007/0168320 A1 | 7/2007 | Borthakur et al. |
| 2007/0180314 A1 | 8/2007 | Kawashima et al. |
| 2007/0208748 A1 | 9/2007 | Li |
| 2007/0209075 A1 | 9/2007 | Coffman |
| 2007/0233826 A1 | 10/2007 | Tindal et al. |
| 2007/0250560 A1 | 10/2007 | Wein et al. |
| 2008/0004022 A1 | 1/2008 | Johannesson et al. |
| 2008/0010372 A1 | 1/2008 | Khedouri et al. |
| 2008/0022059 A1 | 1/2008 | Zimmerer et al. |
| 2008/0046432 A1 | 2/2008 | Anderson et al. |
| 2008/0070575 A1 | 3/2008 | Claussen et al. |
| 2008/0114718 A1 | 5/2008 | Anderson et al. |
| 2008/0183888 A1 | 7/2008 | Brown et al. |
| 2008/0189468 A1 | 8/2008 | Schmidt et al. |
| 2008/0208917 A1 | 8/2008 | Smoot et al. |
| 2008/0208933 A1 | 8/2008 | Lyon |

(56) References Cited

U.S. PATENT DOCUMENTS

| | | |
|---|---|---|
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0243769 A1 | 10/2008 | Arbour et al. |
| 2008/0263401 A1 | 10/2008 | Stenzel |
| 2008/0270578 A1 | 10/2008 | Zhang et al. |
| 2008/0281908 A1 | 11/2008 | Mccanne et al. |
| 2008/0282047 A1 | 11/2008 | Arakawa et al. |
| 2008/0294446 A1 | 11/2008 | Guo et al. |
| 2008/0298233 A1 | 12/2008 | Arora et al. |
| 2009/0007162 A1 | 1/2009 | Sheehan |
| 2009/0019535 A1 | 1/2009 | Mishra et al. |
| 2009/0037975 A1 | 2/2009 | Ishikawa et al. |
| 2009/0041230 A1 | 2/2009 | Williams |
| 2009/0055507 A1 | 2/2009 | Oeda |
| 2009/0055607 A1 | 2/2009 | Schack et al. |
| 2009/0077097 A1 | 3/2009 | Lacapra et al. |
| 2009/0080440 A1 | 3/2009 | Balyan et al. |
| 2009/0089344 A1 | 4/2009 | Brown et al. |
| 2009/0094252 A1 | 4/2009 | Wong et al. |
| 2009/0094311 A1 | 4/2009 | Awadallah et al. |
| 2009/0106255 A1 | 4/2009 | Lacapra et al. |
| 2009/0106263 A1 | 4/2009 | Khalid et al. |
| 2009/0106413 A1 | 4/2009 | Salo et al. |
| 2009/0125955 A1 | 5/2009 | Delorme |
| 2009/0132616 A1 | 5/2009 | Winter et al. |
| 2009/0138314 A1 | 5/2009 | Bruce |
| 2009/0161542 A1 | 6/2009 | Ho |
| 2009/0180477 A1* | 7/2009 | Akahane ............ H04W 40/005 370/392 |
| 2009/0185497 A1 | 7/2009 | Arora et al. |
| 2009/0187915 A1 | 7/2009 | Chew et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0217163 A1 | 8/2009 | Jaroker |
| 2009/0217386 A1 | 8/2009 | Schneider |
| 2009/0240705 A1 | 9/2009 | Miloushev et al. |
| 2009/0240899 A1 | 9/2009 | Akagawa et al. |
| 2009/0241176 A1 | 9/2009 | Beletski et al. |
| 2009/0265396 A1 | 10/2009 | Ram et al. |
| 2009/0265467 A1 | 10/2009 | Peles |
| 2009/0292957 A1 | 11/2009 | Bower et al. |
| 2009/0300161 A1 | 12/2009 | Pruitt et al. |
| 2009/0316708 A1 | 12/2009 | Yahyaoui et al. |
| 2009/0319600 A1 | 12/2009 | Sedan et al. |
| 2010/0017643 A1 | 1/2010 | Baba et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0082542 A1 | 4/2010 | Feng et al. |
| 2010/0093318 A1 | 4/2010 | Zhu et al. |
| 2010/0103819 A1 | 4/2010 | Samuels et al. |
| 2010/0131654 A1 | 5/2010 | Malakapalli et al. |
| 2010/0179984 A1 | 7/2010 | Sebastian |
| 2010/0205206 A1 | 8/2010 | Rabines et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0274772 A1 | 10/2010 | Samuels |
| 2010/0290468 A1* | 11/2010 | Lynam ............... H04L 67/14 370/392 |
| 2010/0306169 A1 | 12/2010 | Pishevar et al. |
| 2010/0325257 A1 | 12/2010 | Goel et al. |
| 2010/0325634 A1 | 12/2010 | Ichikawa et al. |
| 2011/0055921 A1 | 3/2011 | Narayanaswamy et al. |
| 2011/0066736 A1 | 3/2011 | Mitchell et al. |
| 2011/0072321 A1 | 3/2011 | Dhuse |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0107112 A1 | 5/2011 | Resch |
| 2011/0119234 A1 | 5/2011 | Schack et al. |
| 2011/0185082 A1 | 7/2011 | Thompson |
| 2011/0296411 A1 | 12/2011 | Tang et al. |
| 2011/0320882 A1 | 12/2011 | Beaty et al. |
| 2012/0007239 A1 | 1/2012 | Kolics et al. |
| 2012/0117028 A1 | 5/2012 | Gold et al. |
| 2012/0144229 A1 | 6/2012 | Nadolski |
| 2012/0150699 A1 | 6/2012 | Trapp et al. |
| 2012/0150805 A1 | 6/2012 | Pafumi et al. |
| 2013/0058229 A1 | 3/2013 | Casado et al. |
| 2013/0058252 A1 | 3/2013 | Casado et al. |
| 2013/0058255 A1 | 3/2013 | Casado et al. |
| 2013/0074181 A1 | 3/2013 | Singh |
| 2013/0086142 A1 | 4/2013 | Hampel et al. |
| 2014/0040451 A1 | 2/2014 | Agrawal |
| 2014/0143308 A1 | 5/2014 | Tychina |
| 2014/0223556 A1 | 8/2014 | Bignon et al. |
| 2015/0281367 A1 | 10/2015 | Nygren et al. |
| 2015/0282219 A1 | 10/2015 | Kweon et al. |
| 2016/0036647 A1 | 2/2016 | Gonzalez |
| 2016/0140045 A1* | 5/2016 | Bergeron ............ H04L 69/22 711/105 |
| 2017/0195427 A1 | 7/2017 | Choquette |
| 2017/0339219 A1 | 11/2017 | Le et al. |
| 2017/0373953 A1* | 12/2017 | George ............ H04L 43/04 |
| 2018/0041524 A1 | 2/2018 | Reddy |
| 2019/0068694 A1 | 2/2019 | Ripke |
| 2019/0150150 A1 | 5/2019 | Calin et al. |
| 2019/0182363 A1 | 6/2019 | Bonaventure |
| 2019/0182367 A1* | 6/2019 | Kim ............ H04L 45/74 |
| 2020/0186600 A1 | 6/2020 | Dawani |
| 2020/0287967 A1 | 9/2020 | Gafni |
| 2020/0396267 A1 | 12/2020 | Petria |
| 2021/0022041 A1 | 1/2021 | Allan |

FOREIGN PATENT DOCUMENTS

| | | |
|---|---|---|
| CA | 2512312 C | 5/2014 |
| EP | 605088 A3 | 2/1996 |
| EP | 738970 A1 | 10/1996 |
| EP | 1081918 A3 | 12/2003 |
| EP | 3255845 A1 | 12/2017 |
| JP | 63010250 A | 1/1988 |
| JP | 6205006 A | 7/1994 |
| JP | 06332782 A | 12/1994 |
| JP | 08328760 A | 12/1996 |
| JP | 08339355 A | 12/1996 |
| JP | 9016510 A | 1/1997 |
| JP | 11282741 A | 10/1999 |
| JP | 2000183935 A | 6/2000 |
| JP | 6205006 B2 | 9/2017 |
| NZ | 566291 A | 12/2008 |
| WO | 0058870 A3 | 4/2001 |
| WO | 0239696 A3 | 4/2003 |
| WO | 02056181 A3 | 10/2003 |
| WO | 2004061605 A3 | 12/2005 |
| WO | 2006091040 A1 | 8/2006 |
| WO | 2008130983 A1 | 10/2008 |
| WO | 2008147973 A3 | 7/2009 |
| WO | 2017144123 A1 | 8/2017 |

OTHER PUBLICATIONS

"Market Research & Releases, Solstice Diameter Requirements", last accessed Mar. 29, 2010, (http://mainstreet/sites/PD/Teams/ProdMgmt/MarketResearch/Unisversal).

"Respond to sewer depending on TCP: :client_port", DevCentral Forums iRules, pp. 1-6, last accessed Mar. 26, 2010, (http://devcentral.f5.com/Default/aspx?tabid=53&forumid=5&1page=1&v).

F5 Networks Inc., "Deploying the BIG-IP LTM for Diameter Traffic Management," F5.RTM. Deployment Guide, Publication date Sep. 2010, Version 1.2, pp. 1-19.

Mac Vittie, L., "Message-Based Load Balancing: Using F5 solutions to address the challenges of scaling Diameter, RADIUS, and message-oriented protocols", F5 Technical Brief, Jan. 2010, pp. 1-9, F5 Networks Inc., Seattle, Washington.

(56) References Cited

OTHER PUBLICATIONS

Snoeren A., et al., "Managing Cloud Resources:Distributed Rate Limited", Building and Programming the Cloud Workshop, Jan. 13, 2010, pp. 1-10, UCSDCSE Computer Science and Engineering.
Wikipedia, "Diameter (protocol)", pp. 1-11, last accessed Oct. 27, 2010, (http://en.wikipedia.org/wiki/Diameler.sub.--protocol).
Lelil, S., "Storage Technology News: AutoVirt adds tool to help data migration projects," Feb. 25, 2011, last accessed Mar. 17, 2011, 3 pages, <http://searchstorage.techtarget.com/news/article/0,289142,sid5_gci152-7986,00.html>.
Traffix Systems, "Product Brochure, Traffix Signaling Deliver Controller. TM. (SDC)", Mar. 2011, pp. 1-11, F5 Networks Inc.
Traffix Systems, "Signaling Deliver Controller.TM.: Control Your 4G Network", Data Sheet, Mar. 2011, pp. 1-6, F5 Networks Inc.
International Search Report for International Patent Application No. PCT/US2012/038228 (dated Oct. 19, 2012).
Traffix Systems, "Diameter Routing Agent (DRA)", Jul. 2, 2012, pp. 2-5, (http://www traffixsystemscomsolutionsdiameter-routing-agent-DRA).
Traffix Systems, "Signaling Delivery Controller (SDC)", Jul. 1, 2012, pp. 2-5, (http://www traffixsystemscomsolutionsSDC).
Traffix Systems, "Diameter Routing Agent (DRA)", Accessed Apr. 8, 2013, pp. 2-5, (http://www traffixsystemscomsolutionsdiameter-routing-agent-DRA).
F5 Networks Inc., "BIG-IP.RTM. Analytics: Implementations", Manual, Oct. 27, 2015, pp. 1-50, vol. 12.0, F5 Networks, Inc., Retrieved from the Internet:<https://support.f5.com/kb/en-US/products/big-ip_Itm/manuals/- product/Itm-basics-12-0-0.html>.
F5 Networks Inc., "BIG-IP.RTM. Local Traffic Management: Basics", Manual, Oct. 20, 2015, pp. 1-68, vol. 12.0, F5 Networks, Inc., Retrieved from the Internet:<https://support.f5.com/kb/en-us/products/big-ip_Itm/manuals/- product/Itm-basics-12-0-0.html>.
F5 Networks Inc., "BIG-IP LTM and TMOS 12.0.0", Release Notes, Oct. 6, 2016, pp. 1-110, vol. 12.0, F5 Networks, Inc., Retrieved from the Internet:<https://support.f5.com/kb/en-US/products/big-ip_Itm/releasen- otes/product/relnote-Itm-12-0-0.html>.
F5 Networks Inc., "BIG-IP.RTM. Local Traffic Manager. TM.: Implementations", Manual, May 25, 2016, pp. 1-284, vol. 12.0, F5 Networks, Inc., Retrieved from the Internet:<https://support.f5.com/kb/en-US/products/big-ip_Itm/manuals/- product/Itm-implementations-12-0-0.html>.
F5 Networks Inc., "F5 BIG-IP TMOS: Operations Guide", Manual, Mar. 5, 2016, pp. 1-236, F5 Networks, Inc., Retrieved from the Internet:<https://support.f5.com/kb/en-US/products/big-ip_Itm/manuals/- product/f5-tmos-operations-guide.html>.
F5 Networks, Inc , "BIG-IP.RTM. Local Traffic Management: Basics", Manual, May 9, 2016, 58 pages , version 12.1, F5 Networks, Inc.
F5 Networks, Inc., "BIG-IP.RTM. Tmos:.RTM. Implementations", Manual, May 9, 2016, 184 pages, version 12.1, F5 Networks, Inc.
F5 Networks, Inc., "BIG-IP.RTM. Local Traffic Manager.TM.: Implementations", Manual, May 4, 2018, 228 pages, version 12.1, F5 Networks, Inc.
F5 Networks, Inc., "F5 BIG-IP TMOS: Operations Guide", Manual, Dec. 2018, 226 pages, F5 Networks, Inc.
Using Predictive Prefetching to Improve World Wide Web Latency, '96, SIGCOM, all pp. 1-15.
Pearson, P. K., "Fast Hashing of Variable-Length Text Strings," Comm. of the ACM, Jun. 1990, pp. 677-680, vol. 33, No. 6.
Cabrera et al., "Swift: a Storage Architecture for Large Objects," In Proceedings of the—Eleventh IEEE Symposium on Mass Storage Systems, Oct. 1991, pp. 1-7.
Cabrera et al., "Swift: Using Distributed Disk Striping to Provide High I/O Data Rates," Fall 1991, pp. 405-436, vol. 4, No. 4, Computing Systems.
Zayas, E., "AFS-3 Programmer's Reference: Architectural Overview," Sep. 2, 1991, 37 pages, Version 1.0 (doc. No. FS-00-D160) Transarc Corporation.
Cabrera et al., "Using Data Striping in a Local Area Network," 1992, 22 pages, Technical report No. UCSC-CRL-92-09 of the Computer & Information Sciences Department of University of California at Santa Cruz.
Kohl et al., "The Kerberos Network Authentication Service (V5)," RFC 1510, Sep. 1993, 105 pages, http://www.ietf.org/ rfc/rfc1510.txt?number=1510.
Hartman, J., "The Zebra Striped Network File System," 1994, Ph.D. dissertation submitted in the Graduate Division of the University of California at Berkeley.
Long et al., "Swift/RAID: a distributed RAID System", Computing Systems, Summer 1994, 20 pages, vol. 7.
Anderson et al., "Serverless Network File System," in the 15th Symposium on Operating Systems Principles, Dec. 1995, 18 pages, Association for Computing Machinery, Inc.
Callaghan et al., "NFS Version 3 Protocol Specifications" RFC 1813), Jun. 1995, 127 pages, The Internet Engineering Task Force (1E1N.
Padmanabhan, "Using Predictive Prefething to Improve World Wide Web Latency", 1996, SIGCOM, all pages. (1-15).
Savage, et al., "AFRAID—a Frequently Redundant Array of Independent Disks," Jan. 22-26, 1996, pp. 1-13, USENIX Technical Conference, San Diego, California.
Soltis et al., "The Global File System," Sep. 17-19, 1996, 24 pages, in Proceedings of the Fifth NASA Goddard Space Flight Center Conference on Mass Storage Systems and Technologies, College Park, Maryland.
Wilkes, J., et al., "The HP AutoRAID Hierarchical Storage System," Feb. 1996, 29 pages, vol. 14, No. 1, ACM Transactions on Computer Systems.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997, 13 pages.
Modiano, "Scheduling Algorithms for Message Transmission Over a Satellitebroadcast System," MILCOM 97 Proceedings Lincoln Lab., MIT, Lexington, MA 2(2):628-34 (Nov. 2-5, 1997) (Abstract only).
Thekkath et al., "Frangipani: a Scalable Distributed File System," in Proceedings of the 16th ACM Symposium on Operating Systems Principles, Oct. 1997, pp. 1-14, Association for Computing Machinery, Inc.
Fan et al., "Summary Cache: a Scalable Wide-Area Protocol", Computer Communications Review, Association Machinery, New York, USA, Oct. 1998, pp. 254-265, vol. 28, Web Cache Sharing for Computing No. 4.
Haskin et al., "The Tiger Shark File System," 1998, in proceedings of IEEE, Spring COMPCON, Santa Clara, CA, www.research.IBM.com, last accessed on Dec. 30, 2002.
Nichols et al., "Definition of the Differentiated Services Field (DS Field) in the IPV4 and IPV6 Headers," RFC:2474) at http://www.ietf.org/rfc/rfc2474.txt, pp. 1-19 (Dec. 1998.
Patterson et al., "A case for redundant arrays of inexpensive disks (RAID)", Chicago, Illinois, Jun. 1-3, 1998, pp. 109-116, in Proceedings of ACM SIGMOD conference on the Management of Data, Association for Computing Machinery, Inc.
Peterson, M., "Introducing Storage Area Networks," Feb. 1998, 6 pages, InfoStor, www.infostor.com. last accessed on Dec. 20, 2002.
Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.
"CSA Persistent File System Technology," a White Paper, Jan. 1, 1999, pp. 1-3, http://www.cosoa.com/white_papers/pfs.php, Colorado Software Architecture, Inc.
"Distributed File System: a Logical View of Physical Storage: White Paper," 1999, Microsoft Corp., www.microsoft.com, <http://www.eu.microsoft.com/TechNet/prodtechnol/windows2000serv/maint- ain/DFSnt95>, pp. 1-26, last accessed on Dec. 2, 2002.

(56) References Cited

OTHER PUBLICATIONS

Gibson et al., "NASD Scalable Storage Systems," Jun. 1999, 6 pages, USENIX99, Extreme Linux Workshop, Monterey, California.
Iwang et al., "Designing SSI Clusters with Hierarchical Checkpointing and Single 1/0 Space," IEEE Concurrency, Jan.-Mar. 1999, pp. 60-69.
Kimball, C.E. et al., "Automated Client-Side Integration of Distributed Application Servers," 13th LISA Conf., 1999, pp. 275-282 of the Proceedings.
"Scaling Next Generation Web Infrastructure with Content-Intelligent Switching: White Paper," Apr. 2000, pp. 1-9, Alteon Web Systems, Inc.
Carns et al., "PVFS: a Parallel File System for Linux Clusters," in Proceedings of the Extreme Linux Track: 4th Annual Linux Showcase and Conference, Oct. 2000, pp. 317-327, Atlanta, Georgia, USENIX Association.
Farley, M., "Enterprise Storage Forum," Jan. 2000, 2 pages, Book Review—Building Storage Networks, 2.sup.nd Edition, http://www.enterprisestorageforum.com/sans/features/print/0,,10556_144120-1.00.html, Enterprise Storage Forum Staff, last accessed Dec. 20, 2002.
Noghani et al., "A Novel Approach to Reduce Latency on the Internet: 'Component-Based Download'," Proceedings of the Computing, Las Vegas, NV, Jun. 2000, pp. 1-6 on the Internet: Inti Conf. on Internet.
Sorenson, K.M., "Installation and Administration: Kimberlite Cluster Version 1.1.0, Rev. Dec. 2000," 137 pages, Mission Critical Linux, http://oss.missioncriticallinux.com/kimberlite/kimberlite.pdf.
Stakutis, C., "Benefits of SAN-based file system shanng," Jul. 2000, pp. 1-4, InfoStor, www.infostor.com, last accessed on Dec. 30, 2002, Penn Well Corporation.
UDDI, "UDDI Overview", Sep. 6, 2000, pp. 1-21, uddi.org, (http://www.uddi.org/).
UDDI, "UDDI Technical White Paper," Sep. 6, 2000, pp. 1-12, uddi-org, (http://www.uddi.org/).
Woo, "A Modular Approach to Packet Classification: Algorithms and Results," Nineteenth Annual Conference of the IEEE Computer and Communications Societies 3(3)1213-22 (Mar. 26-30, 2000).
"A Storage Architecture Guide," Second Edition, 2001, Auspex Systems, Inc., www.auspex.com, last accessed on Dec. 30, 2002.
"VERITAS SANPoint Foundation Suite(tm) and SANPoint Foundation Suite(tm) HA: New VERITAS Volume Management and File System Technology for Cluster Environments," Sep. 2001, 26 pages, VERITAS Software Corp.
"Windows Clustering Technologies—an Overview," Nov. 2001, 31 pages, Microsoft Corp.
Botzum, Keys, "Single Sign on—a Contrarian View," Aug. 6, 2001, pp. 1-8, Open Group Website, http://www.opengroup.org/security/topics.htm.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).
Gupta et al., "Algorithms for Packet Classification," Dept, of Comput. Sci., Stanford Univ., CA 15(2):24-32 (Mar./Apr. 2001) (Abstract only).
Karamanolis, C. et al., "An Architecture for Scalable and Manageable File Services," HPL-2001-173, Jul. 26, 2001. pp. 1-14.
Norton et al., "CIFS Protocol Version CIFS-Spec 0.9," 2001, 125 pages, Storage Networking Industry Association (SNIA), www.snia.org, last accessed on Mar. 26, 2001.
Novotny et al., "An Online Credential Repository for the Grid: MyProxy," 2001, pp. 1-8.
Rosen et al., "MPLS Label Stack Encoding," RFC:3032) at http://www.ietf.org/4rfc/rfc3032.txt, pp. 1-22 (Jan. 2001).
Sleeper B., "Why UDDI Will Succeed, Quietly: Two Factors Push Web Services Forward", The Stencil Group, Inc., Apr. 2001, pp. 1-7, San Francisco, California.
"NERSC Tutorials: I/O on the Cray T3E, 'Chapter 8, Disk Striping'," National Energy Research Scientific Computing Center (NERSC), http://hpcfnersc.gov, last accessed on Dec. 27, 2002, 9 pages.
"The AFS File System in Distributed Computing Environment," www.transarc.ibm.com/Libraiy/whitepapers/AFS/afsoverview.html, last accessed on Dec. 20, 2002.
Anderson et al., "Interposed Request Routing for Scalable Network Storage," ACM Transactions on Computer Systems 20(1): (Feb. 2002), pp. 1-24.
Baer, T., et al., "The elements of Web services" ADTmag.com, Dec. 1, 2002, pp. 1-6, (http://www.adtmag.com).
F5 Networks Inc., "3-DNS.RTM. Reference Guide, version 4.5", F5 Networks Inc., Sep. 2002, pp. 2-1-2-28, 3-1-3-12, 5-1-5-24, Seattle, Washington.
Ott & Mayer-Patel, "A Mechanism for TCP-Friendly Transport-level Protocol Coordination," USENIX Annual Technical Conference (2002).
Ott et al., "A Mechanism for TCP-Friendly Transport-level Protocol Coordination," Proceedings of the General Track of the Annual Conference on USENIX Annual Technical Conference (Jun. 2002).
Shohoud, Y., "Building XML Web Services with VB .NET and VB 6", Addison Wesley, Sep. 17, 2002, pp. 1-14.
Sleeper B., "The Evolution of UDDI", UDDI.org White Paper, the Stencil Group, Inc., Jul. 19, 2002, pp. 1-15, San Francisco, California.
Anonymous, "How DFS Works: Remote File Systems," Distributed File System (DFS) Mar. 2003, 54 pages, Technical Reference retrieved from the Internet on Jan. 29, 2010, URL<http://technetmicrosoft.com/en-us/library/cc782417(WS. 10,printer).aspx>.
Basney et al., "Credential Wallets: a Classification of Credential Repositories Highlighting MyProxy," Sep. 19-21, 2003, pp. 1-20, 31.sup.st Research Conference on Communication, Information and Internet Policy (TPRC 2003), Arlington, Virginia.
Cavale, M. R., "Introducing Microsoft Cluster Service (MSCS) in the Windows Server 2003", Nov. 2002, 10 pages, Microsoft Corporation.
Heinz, "Priorities in Stream Transmission Control Protocol (SCTP) Multistreaming," Thesis submitted to the Faculty of the University of Delaware (Spring 2003).
International Search Report for International Patent Application No. PCT/US02/00720, dated Mar. 19, 2003.
Katsurashima, W. et al., "NAS Switch: a Novel CIFS Server Virtualization, Proceedings," 20th IEEE/11th NASA Goddard Conference on Mass Storage Systems and Technologies, 2003 (MSST 2003), Apr. 2003.
Pashalidis et al., "A Taxonomy of Single Sign-on Systems," 2003, pp. 1-16, Royal Holloway, University of London, Egham Surray, TW20, 0EX, United Kingdom.
Schilit B., "Bootstrapping Location-Enhanced Web Services", University of Washington, Dec. 4, 2003, (http://www.cs.washington.edu/news/colloq.info.html).
Seeley R., "Can Infravio technology revive UDDI?", ADTmag.com, Oct. 22, 2003, (http://www.adtmag.com).
Sommers F., "Whats New in UDDI 3.0—Part 1", Web Services Papers, Jan. 27, 2003, pp. 1-4, (http://www.webservices.org/index.php/article/articleprint/871/-1/24/).
Sommers F., "Whats New in UDDI 3.0—Part 2", Web Services Papers, Mar. 2, 2003, pp. 1-7, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Tulloch, Mitch, "Microsoft Encyclopedia of Security," 2003, pp. 218, 300-301, Microsoft Press, Redmond, Washington.
UDDI "UDDI Version 3.0.1", UDDI Spec Technical Committee Specification, Oct. 14, 2003, pp. 1-383, uddi.org, (http://www.uddi.org/).

(56) References Cited

OTHER PUBLICATIONS

Apple, Inc., "Mac OS X Tiger Keynote Intro. Part 2," Jun. 2004, www.youtube.com <http://www.youtube.com/watch?v=zSBJwEmRJbY>, 1 page.

Apple, Inc., "Tiger Developer Overview Series: Working with Spotlight," Nov. 23, 2004, www.apple.com using www.archive.org <http://web.archive.org/web/20041123005335/developer.apple.com/macosx/-tiger/spotlight.html>, pp. 1-11.

Fajardo V., "Open Diameter Software Architecture," Jun. 25, 2004, pp. 1-6, Version 1.0.7.

Lamonica M., "Infravio spiffs up Web services registry idea", CNET News.com, May 11, 2004, pp. 1-2, (http://www.news.com).

Pashalidis et al., "Impostor: a Single Sign-on System for Use from Untrusted Devices," Global Telecommunications Conference, 2004, GLOBECOM '04, IEEE, Issue Date: Nov. 29-Dec. 3, 2004, 5 pages, Royal Holloway, University of London.

Seeley R., "Can Infravio technology revive UDDI?", ADTmag.comAccessed Sep. 30, 2004, (http://www.adtmag.com).

International Search Report from International Application No. PCT/US03/41202, dated Sep. 15, 2005.

Kawamoto, D., "Amazon files for Web services patent", CNET News.com, Jul. 28, 2005, pp. 1-2, (http://news.com).

Wang, "Priority and Realtime Data Transfer Over the Best-Effort Internet," Dissertation Abstract (2005).

F5 Networks Inc., "F5 WANJet CIFS Acceleration", White Paper, F5 Networks Inc., Mar. 2006, pp. 1-5, Seattle, Washington.

Aguilera et al., "Improving recoverability in multi-tier storage systems," International Conference on Dependable Systems and Networks (DSN-2007), Jun. 2007, 10 pages, Edinburgh, Scotland.

Blue Coat, "Technology Primer: CIFS Protocol Optimization," Blue Coat Systems Inc., 2007, pp. 1-3, (http://www.bluecoat.com).

Klayman, J., Jul. 18, 2007 e-mail to Japanese associate including instructions for response to office action dated Jan. 22, 2007 in corresponding Japanese patent application No. 2002-556371.

Klayman, J., response filed by Japanese associate to office action dated Jan. 22, 2007 in corresponding Japanese patent application No. 2002-556371.

Korkuzas, V., Communication pursuant to Article 96(2) EPC dated Sep. 11, 2007 in corresponding European patent application No. 02718824.2-2201, 3 pages.

Raghavan B., et al., "Cloud Control with Distributed Rate Limiting", SIGCOMM'07, Aug. 27-31, 2007, pp. 1-11, Department of Computer Science and Engineering, University of California, San Diego, CA.

F5 Networks Inc., "Case Information Log for 'Issues withBoNY upgrade to 4.3'", as early as Feb. 2008.

Harrison, C., May 19, 2008 response to Communication pursuant to Article 96(2) EPC dated Nov. 9, 2007 in corresponding European patent application No. 02718824.2.

International Search Report for International Patent Application No. PCT/US2008/060449 (dated Apr. 9, 2008).

International Search Report for International Patent Application No. PCT/US2008/064677 (dated Sep. 6, 2009).

International Search Report for International Patent Application No. PCT/US2008/083117 (dated Jun. 23, 2009).

Klayman, J., Nov. 13, 2008 e-mail to Japanese associate including instructions for response to office action dated May 26, 2008 in corresponding Japanese patent application No. 2002-556371.

Jesugi, H., English translation of office action dated May 26, 2008 in corresponding Japanese patent application No. 2002-556371, 2 pages.

Jesugi, H., Nov. 26, 2008 amendment filed by Japanese associate in response to office action dated May 26, 2008 in corresponding Japanese patent application No. 2002-556371, 5 pages.

F5 Networks Inc., "F5 Diameter RM", Powerpoint document, Jul. 16, 2009, pp. 1-7.

RSYNC, "Welcome to the RSYNC Web Pages," Retrieved from the Internet URL: http://samba.anu.edu.ut.rsync/. (Retrieved on Dec. 18, 2009), 5 pages.

Extended European Search Report, dated Mar. 25, 2022.

Bhalla, A. et al., "Future-Proof Your Hardware Investment", F5 Networks, Inc., Aug. 16, 2018.

"Software-Defined Hardware: Enabling Performance and Agility with the BIG-IP iSeries Architecture", F5 Networks, Inc., Nov. 11, 2016.

* cited by examiner

METHODS FOR SWITCHING NETWORK PACKETS BASED ON PACKET DATA AND DEVICES

This application claims the benefit of U.S. Provisional Patent Application Ser. No. 62/738,590, filed Sep. 28, 2018, which is hereby incorporated by reference in its entirety.

FIELD

This technology generally relates to methods and devices for network traffic management and, more particularly, to methods for switching network packets based on packet data and devices thereof. BACKGROUND Computer networks may often experience a high volume of network traffic from across a variety of network devices and from a variety of user devices. The high volume of network traffic also translates to high volume of network packets flowing across computer networks.

In order to process these high volume network packets, prior technologies have required a processor or multiple processors within a proxy device to receive the network packets, scan the network packets, and take necessary network actions, such as routing the packets or dropping the packets, based on the scan. In particular, with respect to scanning the network packets so that the necessary action can be taken, prior technologies have required a processor within the network proxy device to identify tags in the packets that represent the client or the type of the service requested. The identified tags are then translated by the processor into necessary network actions. Unfortunately, the implementation of this process has required a large collection of hardware devices which is costly and technologically difficult to effectively manage.

SUMMARY

A method for managing network packets includes separating header data and payload data from each of a plurality of received network packets. Next, digest data is created from the separated header data for each of the plurality of network packets. One or more network actions are identified for each of the plurality of network packets based on the corresponding created digest data. The identified one or more network actions are performed on the separated header data and the payload data.

A non-transitory computer readable medium having stored thereon instructions for managing network packets comprising machine executable code which when executed by at least one processor, causes the processor to separate header data and payload data from each of a plurality of received network packets. Next, digest data is created from the separated header data for each of the plurality of network packets. One or more network actions are identified for each of the plurality of network packets based on the corresponding created digest data. The identified one or more network actions are performed on the separated header data and the payload data.

A network traffic management apparatus including at least one of configurable hardware logic configured to be capable of implementing or a processor coupled to a memory and configured to execute programmed instructions stored in the memory to separate header data and payload data from each of a plurality of received network packets. Next, digest data is created from the separated header data for each of the plurality of network packets. One or more network actions are identified for each of the plurality of network packets based on the corresponding created digest data. The identified one or more network actions are performed on the separated header data and the payload data.

A network traffic management system, comprising one or more traffic management apparatuses, client devices, or server devices, the network traffic management system comprising memory comprising programmed instructions stored thereon and one or more processors configured to be capable of executing the stored programmed instructions to separate header data and payload data from each of a plurality of received network packets. Next, digest data is created from the separated header data for each of the plurality of network packets. One or more network actions are identified for each of the plurality of network packets based on the corresponding created digest data. The identified one or more network actions are performed on the separated header data and the payload data.

This technology provides a number of advantages including providing methods, non-transitory computer readable media, apparatuses, and systems that assist with service switching network packets based on packet data. By using the technique illustrated above, examples of the disclosed technology are able to process a higher number of received packets with a field programmable gate array (FPGA) configured to create the digest data from the network packets and then a processor is able to execute programmed instruction to perform one or more network actions based on the created digest data. Accordingly, network actions, such as routing, load balancing, policing, encrypting, and decrypting by way of example, are performed much more efficiently by dividing the decision making process between the FPGA and the processor. By dividing the processing between the FPGA and the processor, the disclosed technology is able efficiently utilize the operation of fast low level logic (such as a FPGA) and slower higher intelligence device (such as a processor) to manage network traffic effectively.

DETAILED DESCRIPTION

Figure 1:
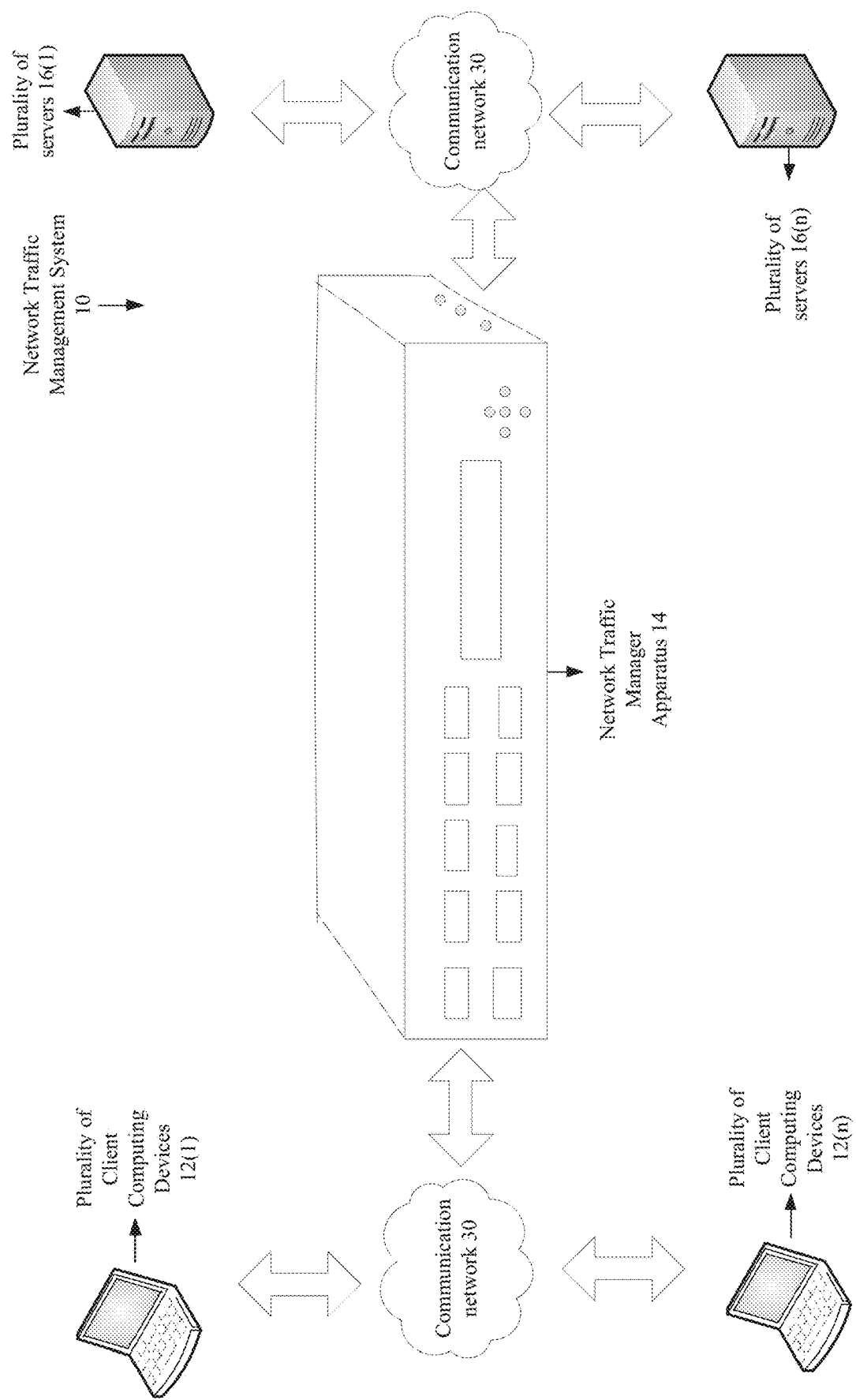
FIG. 1 is an example of a block diagram of a network traffic management system including a network traffic management apparatus for switching network packets based on packet data.
Figure 2:
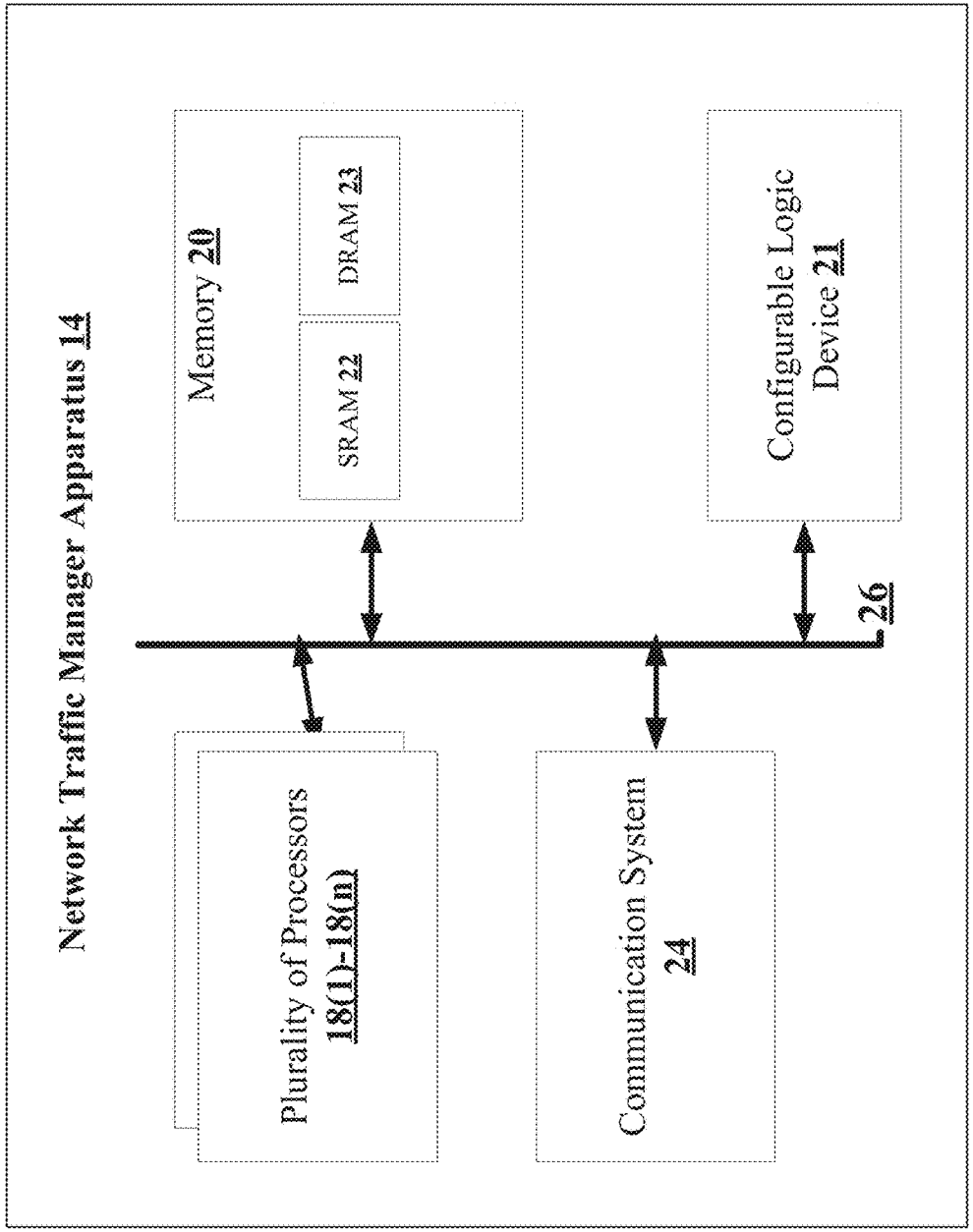
FIG. 2 is an example of a block diagram of a network traffic management apparatus.

An example of a network environment 10 which incorporates a network traffic management system for switching network packets based on packet data with the network traffic manager apparatus 14 is illustrated in FIGS. 1 and 2. The exemplary environment 10 includes a plurality of client computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including switching network packets based on packet data.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of servers 16(1)-16(n) through the communication network 30, although the servers 16(1)-16(n) and the network traffic manager apparatus 14 may be coupled together via other topologies.

The network traffic manager apparatus 14 assists with switching network packets based on packet data as illustrated and described by way of the examples herein, although the network traffic manager apparatus 14 may perform other types and/or numbers of functions. As illustrated in FIG. 2, the network traffic manager apparatus 14 includes a plurality of processors 18(1)-18(n) or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The plurality of processors 18(1)-18(n) within the network traffic manager apparatus 14 may execute one or more computer-executable instructions stored in memory 20 for the methods illustrated and described with reference to the examples herein, although the processor can execute other types and numbers of instructions and perform other types and numbers of operations. The plurality of processors 18(1)-18(n) may comprise one or more central processing units ("CPUs") or general purpose processors with one or more processing cores, such as AMD® processor(s), although other types of processor(s) could be used (e.g., Intel®).

Figure 3:
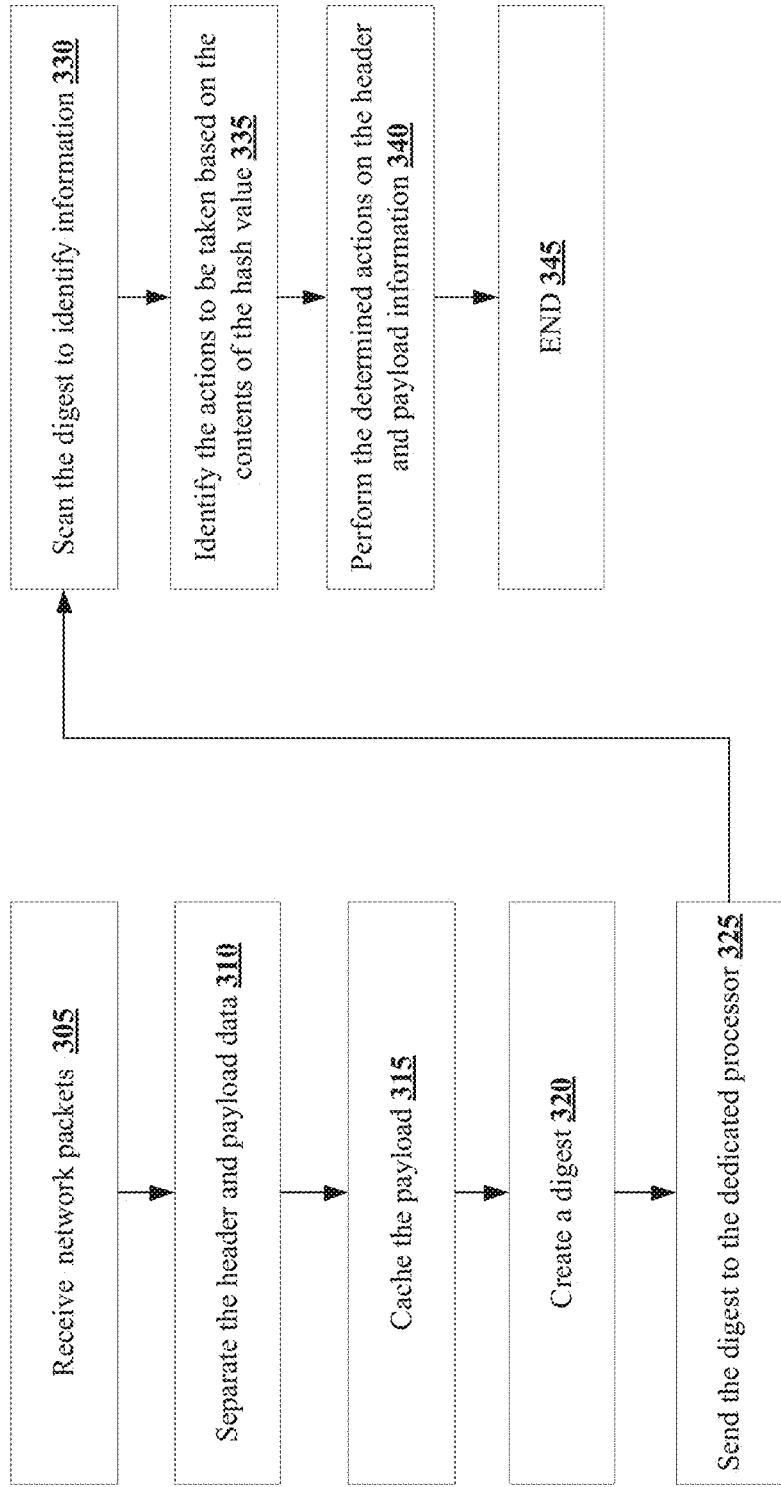
FIG. 3 is an exemplary flowchart of a method for switching network packets based on packet data.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the plurality of processors 18(1)-18(n). The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Figure 4:
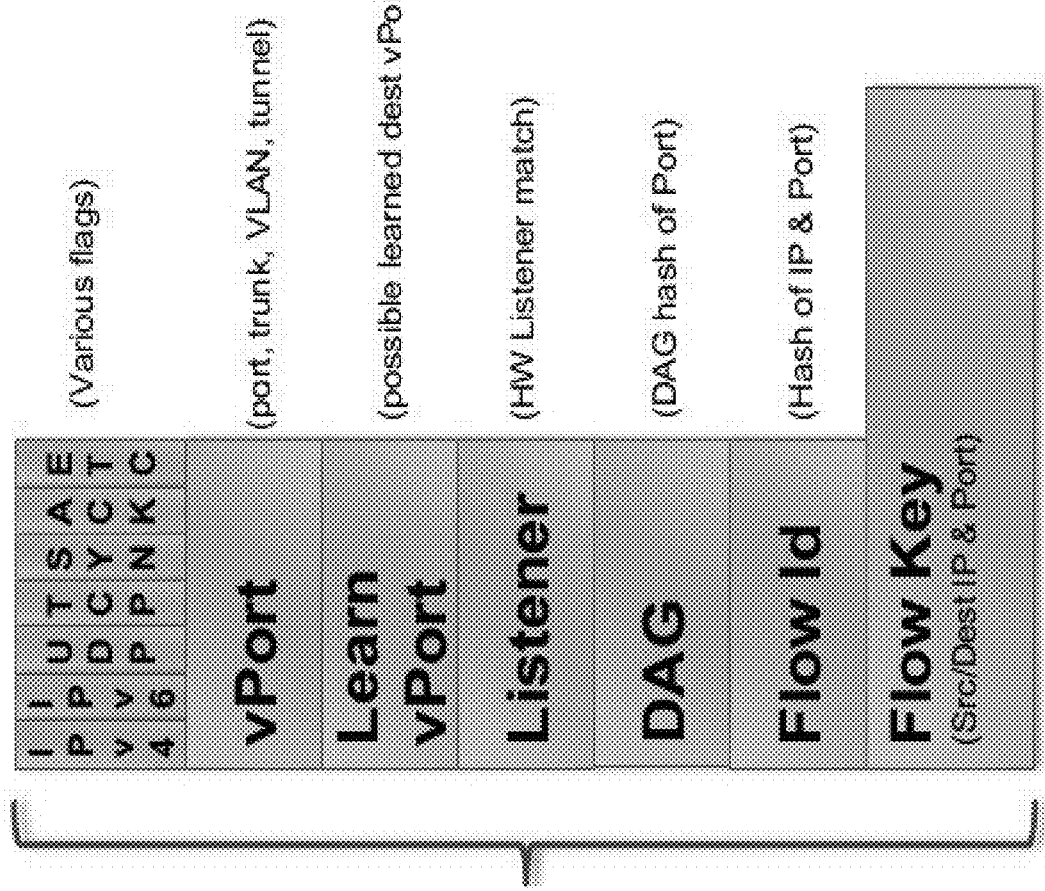
FIG. 4 is an exemplary image of the digest data created from the header of the packet.
Figure 5:
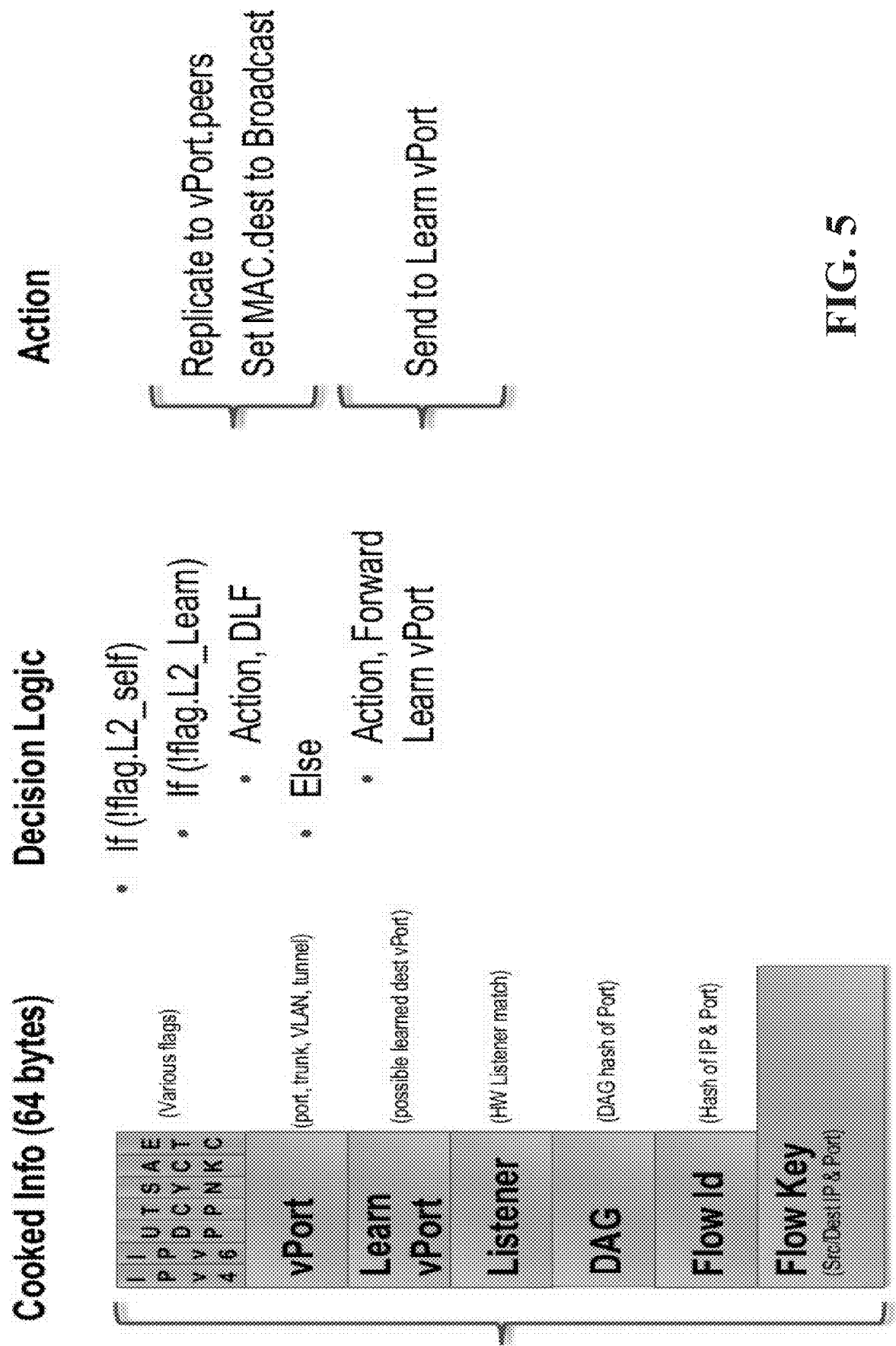
FIG. 5 is an exemplary image of a network action derived from the digest data.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIGS. 3-5. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the plurality of client computing devices 12(1)-12(n), and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the web application servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIF S or NFS protocol in this example, but the principles discussed herein are not limited to this example and can include other application protocols. A series of applications may run on the plurality web application servers 16(1)-16(n) that allows the transmission of applications requested by the plurality of client computing devices 12(1)-12(n), or the network traffic manager apparatus 14. The plurality of servers 16(1)-16(n) may provide data or receive data in response to requests directed toward the respective applications on the plurality of servers 16(1)-16(n) from the plurality of client computing devices 12(1)-12(n) or the network traffic manager apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the plurality of servers 16(1)-16(n) are illustrated as single servers, one or more actions of the plurality of servers 16(1)-16(n) may be distributed across one or more distinct network computing devices. Moreover, the plurality of servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a stand-alone server communicating with network traffic manager apparatus 14 via the communication network(s) 30. In this example the plurality of servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the plurality of servers 16(1)-16(n), for example, may be configured to operate as virtual instances on the same physical machine. In other words, one or more of network traffic manager apparatus 14, the IDP server 13, the plurality of client computing devices 12(1)-12(n), or the plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of servers 16(1)-16(n) than depicted in FIG. 1. The plurality of client computing devices 12(1)-12(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An example of a method for packet switching based on packet data will now be described with reference to FIGS. 1-5. First in step 305, the network traffic manager apparatus 14 receives a plurality of network packets from one of the plurality of client computing devices 12(1)-12(n), although the network traffic manager apparatus 14 can receive the network packets from other devices.

In step 310, the network traffic manager apparatus 14 separates the header data and the payload data in each of the plurality of received network packets, although the network traffic manager apparatus 14 may separate in other manners in other examples. In this example, the network traffic manager apparatus 14 separates the payload data from the header data and forwards the header data for further processing as will be further explained below. By processing only the header data, the technology disclosed will be able to process the network packets at a higher rate because the header data is smaller in size when compared to the payload data.

In step 315, the network traffic manager apparatus 14 caches the payload data within memory 20, although the network traffic manager apparatus 14 can cache or otherwise store the payload data in other manners and/or at other memory locations. In this example, the network traffic manager apparatus 14 caches the payload data into the SRAM 22 or DRAM 23 within the memory 20 as illustrated in FIG. 2. Alternatively in another example, the network traffic manager apparatus 14 can cache the header data along with the payload data in other examples.

In step 320, the network traffic manager apparatus 14 creates a digest data from the header data of the received network packet, although the network traffic manager apparatus 14 can create the digest based on other parameters. In this example and as illustrated in FIG. 4, the FPGA within the network traffic manager apparatus 14 creates a digest including the length of the packet, data associated with the validity of the packet or the length of the packet, the type of the received network packet, port data, trunk data, VLAN data, tunnel data, listener match data, destination port data, dis-aggregator hash port data, hash of the IP and the port address, and the flow key associated with the source/destination IP and port address, although the digest can include other types and/or amounts of information associated with the header data. In this example, the digest of the header data for each of the network packet is entered into a contiguous ring (data structure) where the digest is processed in the order that it arrives into the contiguous ring. Alternatively, in another example, the network traffic manager apparatus 14 can create multiple digests from one header data.

In step 325, the network traffic manager apparatus 14 assigns the digest data for each of the header data to a dedicated processor of the plurality of processors 18(1)-18(n) within the network traffic manager apparatus 14, although the network traffic manager apparatus 14 can assign all the digest data to a shared processor in other examples. In this example, the network traffic manager apparatus 14 selects the dedicated processor from the plurality of processors 18(1)-18(n) based on the contents of the digest data, although the dedicated processor from the plurality of processors 18(1)-18(n) can be selected based on other techniques or parameters such as the received network packets, types of network connections and/or sessions. By assigning the digest data to the dedicated processor, the disclosed technology is able to leave the static decisions, such as creating the digest data to the FPGA, within the network traffic manager apparatus 14 and forward the dynamic decisions to the processor.

Next in step 330, the assigned processor within the network traffic manager apparatus 14 scans the received digest data for a hash value, although the assigned processor within the network traffic manager apparatus 14 can scan the received digest data for other types or amounts of information. In this example, the hash value can be used as an optimization to find information in a secondary or local memory lookup and could be passed with the digest data.

In step 335, the assigned processor within the network traffic manager apparatus 14 identifies the one or more actions to be taken based on the hash value, although the assigned processor within can identify the actions based on many other fields. In this example, the hash value directs the assigned processor within the network traffic manager apparatus 14 to a flow table which includes the one or more actions associated with the hash value or added information (received with the digest data) used to determine the actions. By way of example, as illustrated in FIG. 5, the one or more actions associated with the hash value can include: adding; changing; or deleing one or more MAC or IP addresses from the packet; switching the packet to a new destination; routing the packet to a new next-hop; decrementing the packet's time-to-live; dropping a packet; and/or transforming the header information or the tunnel header information, although other types and/or numbers of actions could be taken based on the requesting client device and/or the type of the packet.

In step 340, the assigned processor within the network traffic manager apparatus 14 performs the identified one or more actions on the header and the payload and the exemplary method ends at step 345. By way of example, FIG. 5 illustrates the processor scanning the digest data to identify the hash value, determining one or more actions from the decision logic, and performing the one or more actions on the payload data and the header data of the received network packets.

Accordingly, as illustrated and described by way of the examples herein, this technology provides a number of advantages including providing methods, non-transitory computer readable media, devices, and system for network packet switching based on the packet data. By using the technique illustrated above, the disclosed technology is able to process a higher number of received packets by configuring the FPGA to create the digest data from the network packets and by utilizing a processor to perform the one or more network actions based on the created digest data. Accordingly, network actions, such as routing, load balancing, policing, encrypting, or decrypting by way of example, are performed much more efficiently by dividing the processing between the FPGA and the processor. By dividing the processing between the FPGA and the processor, the disclosed technology is able efficiently utilize the operation of fast low level logic (such as a FPGA) and slower higher intelligence device (such as a processor) to manage network traffic effectively.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method for managing network packets, the method implemented by a network traffic management system comprising one or more network traffic apparatuses, client devices, or server devices, the method comprising:
separating header data and payload data for a network packet;
creating, exclusively with a field programmable gate array (FPGA) device within a network traffic manager apparatus, digest data from the separated header data for the network packet;
assigning the digest data for each of the header data to a specific processor of a plurality of processors, wherein the specific processor is a separate processor from the FPGA device;
identifying a network action for the network packet based on the created digest data for each of the header data, wherein the identified network action comprises:
adding, changing or deleting a MAC address from the network packet;
adding, changing or deleting an IP address from the network packet;
switching the network packet to a new destination;
routing the network packet to a next-hop;
decrementing the network packet's time-to-live;
dropping the network packet; or
transforming the header data or tunnel data of the network packet; and
performing, exclusively with the assigned separate specific processor of the plurality of processors, the identified network action on the separated header data and the payload data, wherein the specific processor is selected based on the created digest data for each of the header data.

2. The method as set forth in claim 1 further comprising caching the separated payload data until the performing.

3. The method as set forth in claim 1 wherein the identifying further comprises:
identifying a hash value in the created digest data; and
identifying the network action based on the identified hash value.

4. The method as set forth in claim 1 further comprising sending the created digest data to the specific processor for identifying and performing the network action.

5. The method as set forth in claim 1 wherein the digest data comprises a length of the packet, data associated with the validity of the packet or the length of the packet, a type of the network packet, port data, trunk data, VLAN data, tunnel data, listener match data, destination port data, disaggregator hash port data, hash of the IP and the port address, a flow key associated with the source/destination IP and port address, or combinations thereof, and wherein the digest data is entered into a continuous data structure where the digest data is processed in an order that it arrives.

6. A non-transitory computer readable medium having stored thereon instructions for managing network packets comprising executable code which when executed by one or more processors, causes the processors to:
separate header data and payload data for a network packet;
create, exclusively with a field programmable gate array (FPGA) device within a network traffic manager apparatus, digest data from the separated header data for the network packet;
assign the digest data for each of the header data to a specific processor of a plurality of processors, wherein the specific processor is a separate processor from the FPGA device;
identify a network action for the network packet based on the created digest data for each of the header data, wherein the identified network action comprises:
adding, changing or deleting a MAC address from the network packet;
adding, changing or deleting an IP address from the network packet;
switching the network packet to a new destination;
routing the network packet to a next-hop;
decrementing the network packet's time-to-live;
dropping the network packet; or
transforming the header data or tunnel data of the network packet; and
perform, exclusively with the assigned specific processor of the plurality of processors, the identified network action on the separated header data and the payload data, wherein the specific processor is selected based on the created digest data for each of the header data.

7. The medium as set forth in claim 6 further comprises, cache the separated payload data.

8. The medium as set forth in claim 6 wherein the identifying further comprises:
identify a hash value in the created digest data; and
identify the network action based on the identified hash value.

9. The medium as set forth in claim 6 further comprises, send the created digest data to the specific processor for identifying and performing the network action.

10. The medium as set forth in claim 6 wherein the digest data comprises a length of the packet, data associated with the validity of the packet or the length of the packet, a type of the network packet, port data, trunk data, VLAN data, tunnel data, listener match data, destination port data, disaggregator hash port data, hash of the IP and the port address, a flow key associated with the source/destination IP and port address, or combinations thereof, and wherein the digest data is entered into a continuous data structure where the digest data is processed in an order that it arrives.

11. A network traffic manager apparatus, comprising memory comprising programmed instructions stored in the memory and one or more processors configured to be capable of executing the programmed instructions stored in the memory to:
separate header data and payload data for a network packet;
create, exclusively with a field programmable gate array (FPGA) device within a network traffic manager apparatus, digest data from the separated header data for the network packet;
assign the digest data for each of the header data to a specific processor of a plurality of processors, wherein the specific processor is a separate processor from the FPGA device;

identify a network action for the network packet based on the created digest data for each of the header data, wherein the identified network action comprises:
adding, changing or deleting a MAC address from the network packet;
adding, changing or deleting an IP address from the network packet;
switching the network packet to a new destination;
routing the network packet to a next-hop;
decrementing the network packet's time-to-live;
dropping the network packet; or
transforming the header data or tunnel data of the network packet; and
perform, exclusively with the assigned specific processor of the plurality of processors, the identified network action on the separated header data and the payload data, wherein the specific processor is selected based on the created digest data for each of the header data.

12. The apparatus as set forth in claim 11 wherein the one or more processors are further configured to be capable of executing the programmed instructions stored in the memory to cache the separated payload data.

13. The apparatus as set forth in claim 11 wherein the one or more processors are further configured to be capable of executing the programmed instructions stored in the memory wherein the identifying further comprises:
identify a hash value in the created digest data; and
identify the network action based on the identified hash value.

14. The apparatus as set forth in claim 11 wherein the one or more processors are further configured to be capable of executing the programmed instructions stored in the memory to send the created digest data to the specific processor for identifying and performing the network action.

15. The apparatus as set forth in claim 11 wherein the digest data comprises a length of the packet, data associated with the validity of the packet or the length of the packet, a type of the network packet, port data, trunk data, VLAN data, tunnel data, listener match data, destination port data, dis-aggregator hash port data, hash of the IP and the port address, a flow key associated with the source/destination IP and port address, or combinations thereof, and wherein the digest data is entered into a continuous data structure where the digest data is processed in an order that it arrives.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
separate header data and payload data for a network packet;
create, exclusively with a field programmable gate array (FPGA) device within a network traffic manager apparatus, digest data from the header data for the network packet;
assign the digest data for each of the header data to a specific processor of a plurality of processors, wherein the specific processor is a separate processor from the FPGA device;
identify a network action for the network packet based on the created digest data for each of the header data, wherein the identified network action comprises:
adding, changing or deleting a MAC address from the network packet;
adding, changing or deleting an IP address from the network packet;
switching the network packet to a new destination;
routing the network packet to a next-hop;
decrementing the network packet's time-to-live;
dropping the network packet; or
transforming the header data or tunnel data of the network packet; and
perform, exclusively with the assigned specific processor of the plurality of processors, the identified network action on the separated header data and the payload data, wherein the specific processor is selected based on the created digest data for each of the header data.

17. The network traffic management system of claim 16, wherein the one or more processors are further configured to be capable of executing the programmed instructions stored in the memory to cache the separated payload data.

18. The network traffic management system of claim 16, wherein the one or more processors are further configured to be capable of executing the programmed instructions stored in the memory wherein the identifying further comprises:
identify a hash value in the created digest data; and
identify the network action based on the identified hash value.

19. The network traffic management system of claim 16, wherein the one or more processors are further configured to be capable of executing the programmed instructions stored in the memory to send the created digest data to the specific processor for identifying and performing the network action.

20. The network traffic management system of claim 16 wherein the digest data comprises a length of the packet, data associated with the validity of the packet or the length of the packet, a type of the network packet, port data, trunk data, VLAN data, tunnel data, listener match data, destination port data, dis-aggregator hash port data, hash of the IP and the port address, a flow key associated with the source/destination IP and port address, or combinations thereof, and wherein the digest data is entered into a continuous data structure where the digest data is processed in an order that it arrives.

* * * * *